(12) United States Patent
Neff

(10) Patent No.: US 7,451,930 B1
(45) Date of Patent: Nov. 18, 2008

(54) LOW PROFILE ADJUSTABLE OPTICAL CELL MOUNT

(75) Inventor: Todd M. Neff, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 360 days.

(21) Appl. No.: 11/330,438

(22) Filed: Jan. 12, 2006

(51) Int. Cl.
*G06K 7/10* (2006.01)
(52) U.S. Cl. .................. 235/454; 235/453; 235/459; 403/342
(58) Field of Classification Search .............. 235/453, 235/454, 439, 459; 2/422; 403/342; 248/188.5; 74/89.35; 52/480
See application file for complete search history.

(56) References Cited

U.S. PATENT DOCUMENTS

| | | | | | |
|---|---|---|---|---|---|
| 2,940,784 | A | * | 6/1960 | Fell | 74/89.35 |
| 4,221,328 | A | * | 9/1980 | Kramer | 235/454 |
| 5,074,703 | A | * | 12/1991 | Dawson | 403/342 |
| 6,584,745 | B1 | * | 7/2003 | Johansson | 52/480 |

* cited by examiner

*Primary Examiner*—Seung H Lee
(74) *Attorney, Agent, or Firm*—Jeffrey D. Myers; Peacock Myers, P.C.; Timothy D. Stanley

(57) ABSTRACT

An optical cell mount and a corresponding method of mounting an optical cell comprising inserting into the optical cell an adjustable nut portion comprising an upper section threaded on the outside and a lower section threaded on the inside and rounded on the bottom exterior thereof, contacting with the adjustable nut portion a seating portion for receiving the lower section, and securing the adjustable nut portion with a set screw portion having threading corresponding to that of the lower section.

18 Claims, 2 Drawing Sheets

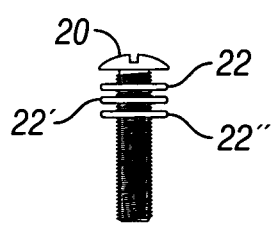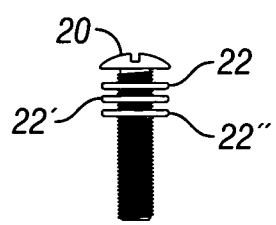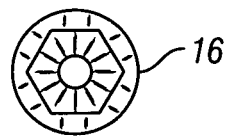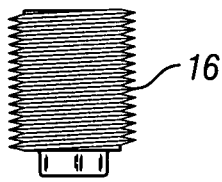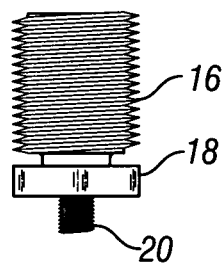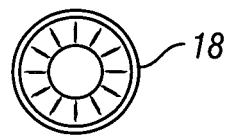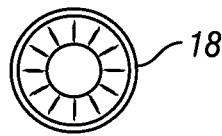
*FIG. 2*  *FIG. 3*  *FIG. 4*

LOW PROFILE ADJUSTABLE OPTICAL CELL MOUNT

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to apparatuses and methods for providing lens and mirror adjustability.

2. Description of Related Art

Adjustors to move and secure optical cells (e.g., mirrors or lenses) are often needed in optics applications. However, no adjustor will work well in 2 degrees of freedom in rotation and 1 degree of freedom in translation. All other known mirror adjustment approaches are too long and/or too cumbersome.

The low profile adjustable optical cell/lens and mirror mount of the present invention takes up much less space than previous designs and has fewer parts while accomplishing the same mounting and securing task. It also allows for more range of motion in the adjustor than previous designs. The low profile adjustor of the invention can be used on any optical, laser, or infrared design in need of optical cell (e.g., mirror or lens) adjustments.

BRIEF SUMMARY OF THE INVENTION

The present invention is of an optical cell mount and a corresponding method of mounting an optical cell, comprising: inserting into the optical cell an adjustable nut portion comprising an upper section threaded on the outside and a lower section threaded on the inside and rounded on the bottom exterior thereof; contacting with the adjustable nut portion a seating portion for receiving the lower section; and securing the adjustable nut portion with a set screw portion having threading corresponding to that of the lower section. In the preferred embodiment, the adjustable nut portion pivots in two degrees of freedom and most preferably additionally allows translation in one degree of freedom. The seating portion preferably comprises a floating wedge, most preferably a ring comprising an interior sloped portion. The set screw portion preferably comprises a locking set screw and one or more springs, preferably one or more o-rings or one or more belleville washers (most preferably three).

Objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE VIEW OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention. As to the drawings:

FIG. 2 is a disassembled view of the preferred embodiment with a top view of the adjustable nut;

FIG. 3 is a disassembled view of the preferred embodiment with a side view of the adjustable nut; and FIG. 4 is a side assembled view of the preferred embodiment.

DETAILED DESCRIPTION OF THE INVENTION

Figure 1:
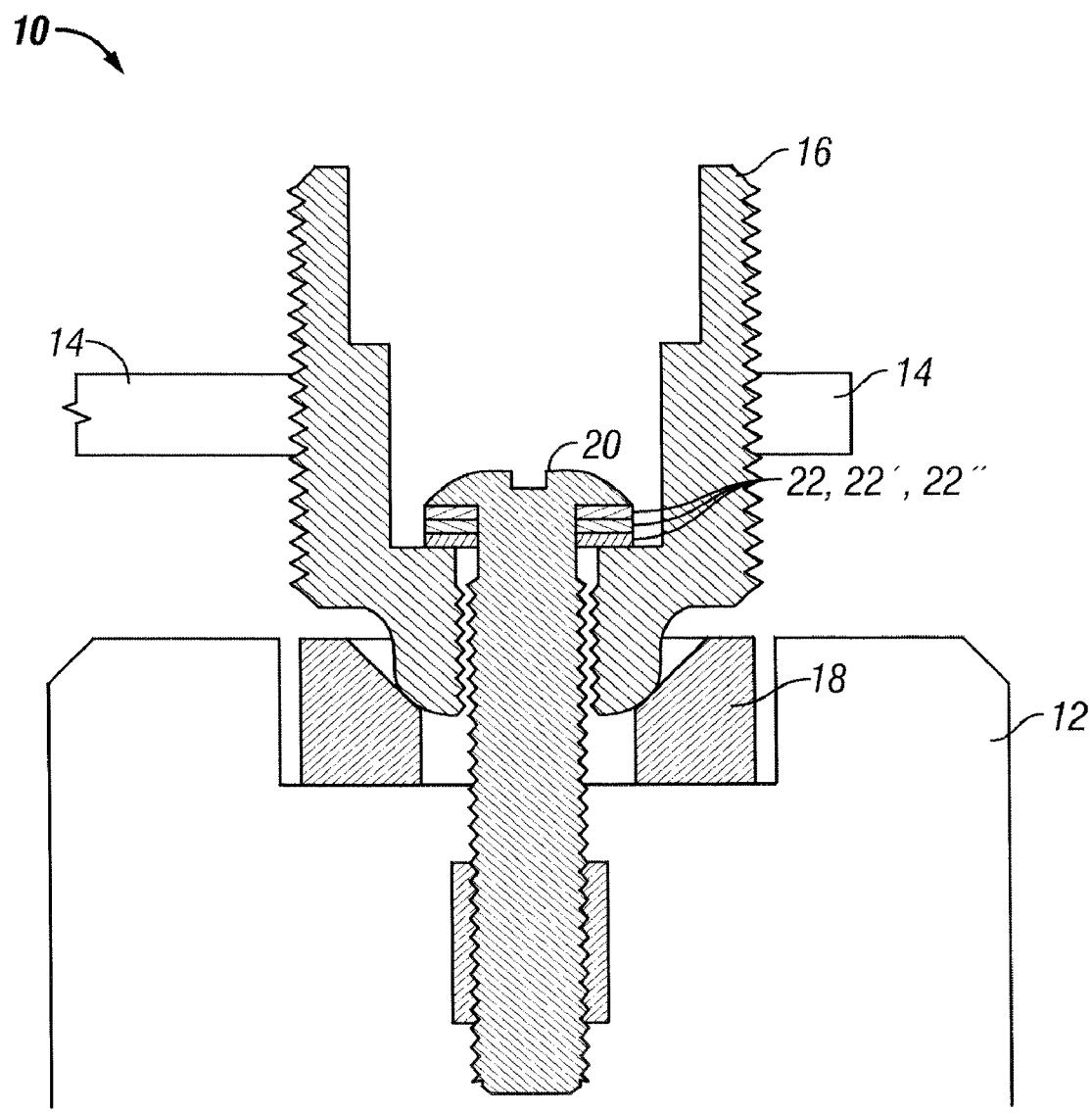
FIG. 1 is a sectional view of the preferred embodiment of the present invention mounted in an optical housing and through a optical cell (e.g., mirror or lens cell)

The present invention is of a low profile adjustable optical cell mount. It preferably comprises a seating portion, an adjustable nut portion, and a set screw portion. The seating portion preferably comprises a floating wedge. The adjustable nut is preferably threaded on the outside and preferably comprises a rounded bottom portion for seating in the seating portion. The set screw portion preferably comprises a button head locking set screw, most preferably additionally comprising one or more springs, such as o-rings or belleville washers.

By submerging the button head set screw inside of the adjustable nut, the adjustment feature is reduced in height substantially compared to existing designs. This yields a lower profile and allows for about twice the adjustable range of existing devices.

FIG. 1 shows the preferred embodiment 10 of the present invention mounted in an optical housing 12 and through a optical cell 14. Three of these assemblies would typically be used for one adjustable optical cell (e.g., a mirror or lens). By turning the adjustable nut 16, one can translate the optical cell and one can rotate or pivot it and steer a beam of laser light, forward-looking infrared radar (FLIR) imagery, etc. The assemblies additionally comprise a floating wedge 18, a locking set screw 20, and one or more (preferably three) belleville washers 22,22',22".

FIGS. 2-4 show the preferred embodiment in disassembled form and assembled form not in conjunction with an optical cell and housing.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An optical cell mount comprising:

an adjustable nut portion comprising an upper section threaded on the outside and a lower section threaded on the inside and rounded on the bottom exterior thereof, wherein said adjustable nut portion pivots in two degrees of freedom;

a seating portion for receiving said lower section; and a set screw portion with threading corresponding to that of said lower section.

2. The optical cell mount of claim 1 wherein said adjustable nut portion allows translation in one degree of freedom.

3. The optical cell mount of claim 1 wherein said seating portion comprises a floating wedge.

4. The optical cell mount of claim 3 wherein said seating portion comprises a ring comprising an interior sloped portion.

5. The optical cell mount of claim 1 wherein said set screw portion comprises a locking set screw.

6. The optical cell mount of claim 1 wherein said set screw portion comprises one or more springs.

7. The optical cell mount of claim 6 wherein said springs comprise one or more o-rings.

8. The optical cell mount of claim 6 wherein said springs comprise one or more belleville washers.

9. The optical cell mount of claim 8 wherein said springs consist of three belleville washers.

10. A method of mounting an optical cell, the method comprising the steps of:
   inserting into the optical cell an adjustable nut portion comprising an upper section threaded on the outside and a lower section threaded on the inside and rounded on the bottom exterior thereof, wherein the adjustable nut portion pivots in two degrees of freedom;
   contacting with the adjustable nut portion a seating portion for receiving the lower section; and
   securing the adjustable nut portion with a set screw portion having threading corresponding to that of the lower section.

11. The method of claim 10 wherein the adjustable nut portion allows translation in one degree of freedom.

12. The method of claim 10 wherein the seating portion comprises a floating wedge.

13. The method of claim 12 wherein the seating portion comprises a ring comprising an interior sloped portion.

14. The method of claim 10 wherein the set screw portion comprises a locking set screw.

15. The method of claim 10 wherein the set screw portion comprises one or more springs.

16. The method of claim 15 wherein the springs comprise one or more o-rings.

17. The method of claim 15 wherein the springs comprise one or more belleville washers.

18. The method of claim 17 wherein the springs consist of three belleville washers.

* * * * *